UNITED STATES PATENT OFFICE.

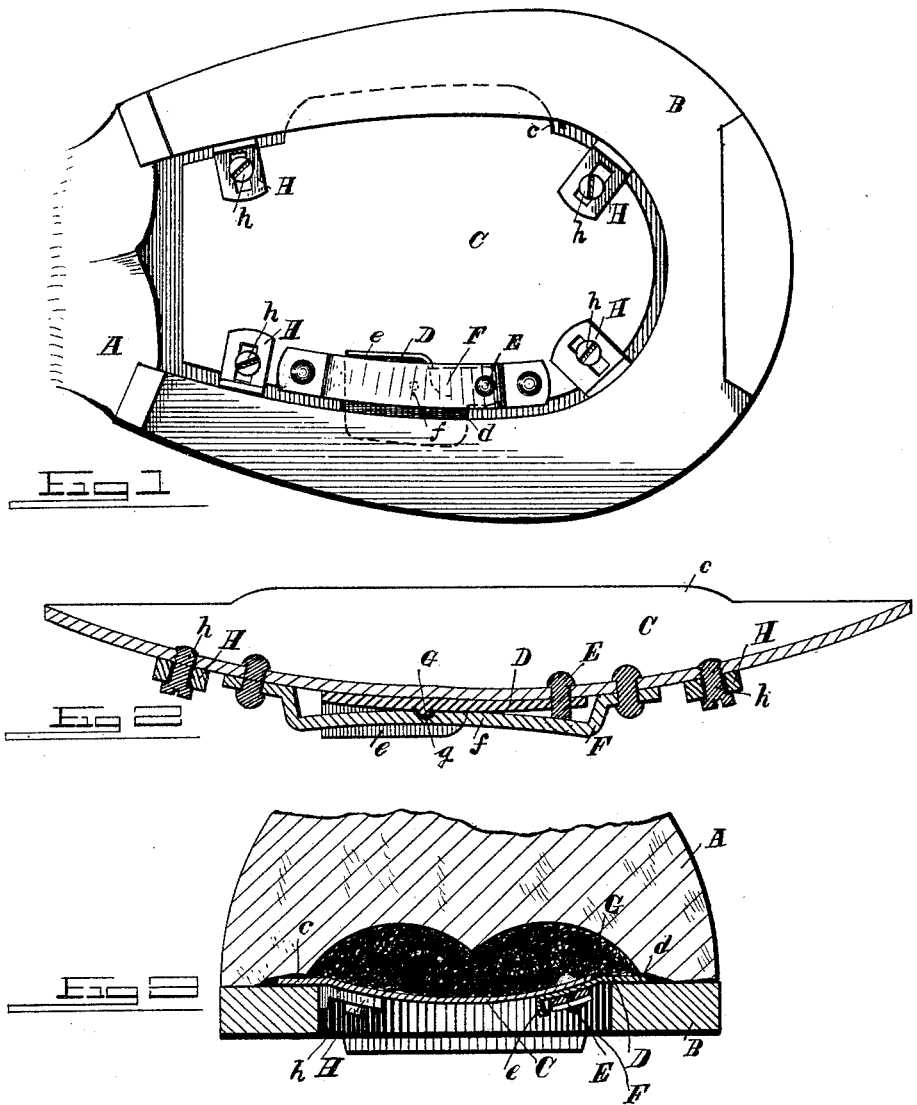

LUTHER EDWIN MELLEN, OF MIDDLEBURY, VERMONT.

HOOF-PROTECTOR.

SPECIFICATION forming part of Letters Patent No. 439,537, dated October 28, 1890.

Application filed March 21, 1890. Serial No. 344,753. (No model.)

*To all whom it may concern:*

Be it known that I, LUTHER EDWIN MELLEN, of Middlebury, in the county of Addison and State of Vermont, have invented certain new and useful Improvements in Hoof-Protectors; and I do hereby declare that the following is a full, clear, and exact description thereof, reference being had to the accompanying drawings, and to the letters of reference marked thereon, which form part of this specification, in which—

Figure 1 is a bottom view of a horse hoof and shoe with my improved hoof-pad retaining-plate or protector applied thereto. Fig. 2 is a detail sectional view through the plate and its latch-locking devices on line $x$ $x$, Fig. 1. Fig. 3 is a transverse sectional view through the plate, shoe, and portion of the hoof on line $w$ $w$, Fig. 1.

This invention is an improvement in devices for protecting horse and animal hoofs by preventing packing of dirt, snow, &c., upon and around the frog of the hoof, and also for retaining a padding around the frog in treating diseases of the hoof; and to this end the invention consists in a metallic plate corresponding roughly in contour to the outline of the hoof or curve of the shoe and adapted to be inserted between the arms of the shoe, and in certain novel devices attached to the plate for securing and retaining it in position, as will be clearly understood from the following description and claims.

In the drawings, letter A indicates an animal-hoof, and B an ordinary iron shoe fastened thereon, as usual.

C designates the protector, consisting of a plate corresponding in general contour to the inner curve of the shoe, and preferably made slightly concavo-convex in cross-section, as indicated in the sectional figures of the drawings.

$c$ designates a lip projecting from one side of the protector and formed integral therewith and adapted to be inserted between the inner edge of one side of shoe B and the hoof, as shown, to hold that side of the protector in position. At the opposite side of the protector is a latch D, pivotally secured at one end to plate C by a rivet E and formed with a lip $d$ on its outer edge, which can be forced between the adjoining side of shoe B and the hoof when the latch is forced outward, or can be disengaged therefrom when the latch is forced inward. The inner edge of the latch has a depending portion $e$, by which it can be conveniently shifted.

F designates a guard for latch D, consisting of a spring-metal strip lying longitudinally over latch D and secured by riveting its ends to the plate C, as indicated. The guard hugs the latch closely and it is bent at center, as indicated at $f$, so that it binds upon the free portion of the latch and presses it tightly against plate C, but does not prevent the forcible shifting of the latch. In order to positively lock the latch when projected (i. e., when its lip $d$ is engaged between the shoe and hoof, as shown,) the latch is formed with a protuberance G on its outer face, and the guard F has a corresponding sink $g$ in its under face, into which protuberance G springs or enters when the latch is projected, and as the spring-yoke must yield or give before the protuberance can disengage the sink an effectual locking of the latch is obtained. All the pressure on the guard caused by contact with the earth when the animal is moving only tends to force it more firmly upon the latch and bind it the tighter to the plate. The guard, besides acting as a lock in the manner described, serves to limit the projection of the latch, as its inner edge is engaged by portion $e$ when the latch is projected. The guard protects the ends of the latch, so that dirt cannot be forced thereunder, and breaking of the latch by striking against its ends is prevented.

In order to properly center the protector in the shoe in case it does not exactly correspond in contour therewith or is of smaller size than would preferably be employed and to avoid trimming of the edges of the plate, I employ the adjustable stays H H, consisting of short strips having their outer ends bent downward and their other portion longitudinally slotted. About four of these stays are employed—two at front and two at rear of the plate and at opposite sides thereof. They are secured by screws $h$ $h$, the shanks of which pass through the slots of the stays and engage threaded openings in the plate. By loosening these screws the stays can be shifted, and by tightening the screws the stays are locked. In practice if the plate be rather small the stays are so adjusted that their heads or bent ends overreach the edges of the plate and contact with the side of the shoe, as indicated in Fig. 1, the stays on opposite sides being so adjusted that when fastened the protector is about centered within the shoe. The lips *c* and *d* prevent escape of the protector. A medicinal packing or padding may be placed between the protector and frog of the hoof, if desired. The plate being preferably made of metal and having its convex face outward, it will prevent packing of dirt, snow, &c., in the shoe and around the frog, and will withstand the strain incident to the stamping of the animal in traveling or in the stall.

Having thus described my invention, I claim—

1. The herein-described hoof-protector, consisting of the plate C, having the lip *c* at one side, the latch-piece D, pivoted to the opposite side of the plate and having a protuberance G, and a spring-metal yoke F, secured to plate C over latch D, and having a sink *g* and bent at center so as to bear upon the latch, substantially as and for the purpose described.

2. The combination of the protector, constructed substantially as described, with the adjustable centering stay-pieces secured thereto, and the securing devices for the protector, all substantially in the manner and for the purpose set forth.

In testimony that I claim the foregoing as my own I affix my signature in presence of two witnesses.

LUTHER EDWIN MELLEN.

Witnesses:
SEYMOUR EDGERTON,
Mrs. L. E. MELLEN.